(12) United States Patent
Kasuya

(10) Patent No.: US 12,233,404 B2
(45) Date of Patent: Feb. 25, 2025

(54) EXHAUST GAS PURIFICATION CATALYST

(71) Applicant: Cataler Corporation, Kakegawa (JP)

(72) Inventor: Chihiro Kasuya, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 448 days.

(21) Appl. No.: 17/763,254

(22) PCT Filed: Aug. 20, 2020

(86) PCT No.: PCT/JP2020/031422
§ 371 (c)(1),
(2) Date: Mar. 24, 2022

(87) PCT Pub. No.: WO2021/065238
PCT Pub. Date: Aug. 4, 2021

(65) Prior Publication Data
US 2022/0362756 A1    Nov. 17, 2022

(30) Foreign Application Priority Data
Oct. 1, 2019  (JP) .................................. 2019-181628

(51) Int. Cl.
*B01J 21/04* (2006.01)
*B01D 53/94* (2006.01)
(Continued)

(52) U.S. Cl.
CPC .......... *B01J 35/657* (2024.01); *B01D 53/944* (2013.01); *B01D 53/945* (2013.01); *B01J 21/04* (2013.01);
(Continued)

(58) Field of Classification Search
CPC ........ B01J 21/04; B01J 21/063; B01J 21/066; B01J 21/08; B01J 21/10; B01J 21/12;
(Continued)

(56) References Cited

U.S. PATENT DOCUMENTS 4,927,799 A * 5/1990 Matsumoto ............... B01J 23/83
502/303
5,075,276 A * 12/1991 Ozawa ....................... B01J 23/63
502/302

(Continued)

FOREIGN PATENT DOCUMENTS

| CN | 102186582 A | 9/2011 |
| CN | 107405614 A | 11/2017 |

(Continued)

OTHER PUBLICATIONS

Office Action issued in Japanese Application No. 2019-181628 dated Oct. 5, 2023.

(Continued)

*Primary Examiner* — Cam N. Nguyen
(74) *Attorney, Agent, or Firm* — Occhiuti & Rohlicek LLP

(57) ABSTRACT

The present invention provides an exhaust gas purification catalyst including a base material and a catalyst layer that is arranged on the base material. The catalyst layer includes a catalyst metal and a carrying material carrying the catalyst metal. The catalyst layer satisfies below: (1) in a pore distribution curve measured by a mercury porosimeter, a peak for the largest pore volume exists within a range of a pore diameter equal to or more than 1 μm and not more than 10 μm; and (2) on an electron microscopy observation image (with a 1000-fold magnification) of a surface of the catalyst layer, when areas of a plurality of voids comprised in the electron microscopy observation image are respectively calculated, a standard deviation for the areas of the plurality of voids is not more than 30 μm².

19 Claims, 3 Drawing Sheets

(51) Int. Cl.

| | |
|---|---|
| *B01J 21/06* | (2006.01) |
| *B01J 21/08* | (2006.01) |
| *B01J 21/10* | (2006.01) |
| *B01J 21/12* | (2006.01) |
| *B01J 21/14* | (2006.01) |
| *B01J 23/10* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 23/63* | (2006.01) |
| *B01J 35/40* | (2024.01) |
| *B01J 35/60* | (2024.01) |
| *B01J 35/64* | (2024.01) |
| *B01J 35/69* | (2024.01) |
| *F01N 3/28* | (2006.01) |

(52) U.S. Cl.
CPC ............. *B01J 23/63* (2013.01); *B01J 35/40* (2024.01); *B01J 35/69* (2024.01); *F01N 3/2828* (2013.01); *B01D 2255/1023* (2013.01); *B01D 2255/1025* (2013.01); *B01D 2255/908* (2013.01); *B01D 2255/9155* (2013.01); *B01D 2255/9205* (2013.01); *F01N 3/2842* (2013.01); *F01N 2330/02* (2013.01); *F01N 2370/02* (2013.01)

(58) Field of Classification Search
CPC ... B01J 21/14; B01J 23/10; B01J 23/42; B01J 23/44; B01J 23/46; B01J 23/58; B01J 23/63; B01J 35/40; B01J 35/657; B01J 35/69; B01D 53/944; B01D 53/945; F01N 3/2828
USPC ........ 502/258–262, 302–304, 332–334, 339, 502/349–351, 355, 415, 439
See application file for complete search history.

(56) References Cited

U.S. PATENT DOCUMENTS

| | | | | | |
|---|---|---|---|---|---|
| 5,462,907 | A | * | 10/1995 | Farrauto | B01J 23/10 502/304 |
| 5,491,120 | A | * | 2/1996 | Voss | B01J 23/63 502/262 |
| 6,255,249 | B1 | * | 7/2001 | Voss | B01J 37/0215 502/262 |
| 7,547,656 | B2 | * | 6/2009 | Miura | B01D 53/945 502/527.12 |
| 7,977,276 | B2 | * | 7/2011 | Kikuchi | B01D 53/945 502/325 |
| 8,455,391 | B2 | * | 6/2013 | Hanaki | B01J 23/894 502/262 |
| 8,609,578 | B2 | * | 12/2013 | Nakamura | B01J 23/002 502/328 |
| 8,722,001 | B2 | * | 5/2014 | Ono | F01N 13/16 502/328 |
| 9,358,524 | B2 | * | 6/2016 | Nagao | B01J 23/002 |
| 9,610,564 | B2 | * | 4/2017 | Xue | B01J 23/10 |
| 9,611,774 | B2 | * | 4/2017 | Xue | B01J 23/63 |
| 10,022,705 | B2 | * | 7/2018 | Kimura | B01J 23/63 |
| 10,086,363 | B2 | * | 10/2018 | Onoe | B01D 46/2429 |
| 10,286,392 | B2 | * | 5/2019 | Kobayashi | B01J 29/85 |
| 10,378,409 | B2 | * | 8/2019 | Yamauchi | F01N 3/106 |
| 10,618,034 | B2 | * | 4/2020 | Kasuya | F01N 3/101 |
| 10,668,459 | B2 | * | 6/2020 | Hirano | B01J 37/0215 |
| 11,110,435 | B2 | * | 9/2021 | Onoe | B01J 37/0248 |
| 11,213,778 | B2 | * | 1/2022 | Goto | C04B 35/638 |
| 2011/0200506 | A1 | | 8/2011 | Ono et al. | |
| 2013/0059724 | A1 | * | 3/2013 | Hirose | B01D 46/2429 428/116 |
| 2015/0266004 | A1 | | 9/2015 | Kumatani et al. | |
| 2015/0273462 | A1 | | 10/2015 | Iwakura et al. | |
| 2018/0243728 | A1 | | 8/2018 | Katoh et al. | |
| 2019/0299139 | A1 | | 10/2019 | Tanaka | |

FOREIGN PATENT DOCUMENTS

| | | |
|---|---|---|
| CN | 109219478 A | 1/2019 |
| EP | 3263241 A1 | 1/2018 |
| JP | 2001000862 A | 1/2001 |
| JP | 2003251201 A | 9/2003 |
| JP | 2004025013 A | 1/2004 |
| JP | 2005021818 A | 1/2005 |
| JP | 2005144274 A | 6/2005 |
| JP | 2009165929 A | 7/2009 |
| JP | 2011152498 A | 8/2011 |
| JP | 2014024058 A | 2/2014 |
| JP | 2015171716 A | 10/2015 |
| JP | 2017217646 A | 12/2017 |
| JP | 2018171615 A | 11/2018 |
| WO | 2010044453 A1 | 3/2012 |
| WO | 2016136560 A1 | 9/2016 |
| WO | 2017209083 A1 | 12/2017 |

OTHER PUBLICATIONS

International Search Report, Jun. 10, 2020 (3 Pages).
Office Action issued in Chinese Application No. 202080068561.9 dated Mar. 6, 2024.
Translation of the Written Opinion in PCT/JP2020/031422, published Apr. 14, 2022 (7 pages).
Office Action in Indian Application No. IN202227021164, published Sep. 9, 2022 (6 pages).
Extended European Search Report in EP 20871225.7, published Sep. 12, 2022 (6 pages).

* cited by examiner

EXHAUST GAS PURIFICATION CATALYST

CROSS REFERENCE TO RELATED APPLICATIONS

This application is a U.S. national stage application of International Application no. PCT/JP2020/031422, filed Aug. 8, 2020, which claims the benefit of the filing date of Japanese Application No. 2019-181628, filed Oct. 1, 2019, the contents of which are hereby incorporated by reference in their entirety.

TECHNICAL FIELD

The present invention relates to an exhaust gas purification catalyst. Particularly, the present invention relates to an exhaust gas purification catalyst that is arranged on an exhaust path of an internal combustion engine and that purifies the exhaust gas exhausted from the internal combustion engine.

BACKGROUND ART

The exhaust gas, which is exhausted from an internal combustion engine of a vehicle, such as an automatic two-wheeled vehicle and an automatic four-wheeled vehicle, contains harmful components, such as hydrocarbon (HC), nitrogen oxide (NOx), and carbon monoxide (CO). In order to efficiently react these harmful components or remove these harmful components from the exhaust gas, the exhaust gas purification catalyst has been used conventionally. As the conventional technique document related to the exhaust gas purification catalyst, for example, Patent Documents 1 to 4 can be obtained.

Anyway, a reaction property on the high flow rate (High SV: Space Velocity) condition with high load and high rotation is required for the exhaust gas purification catalyst disposed on the vehicle. Thus, it is important to properly secure the flow channel of the exhaust gas in the catalyst layer and to enhance the exhaust gas diffusion property to the catalyst layer. Related to this matter, for example, Patent Document 1 at the embodiment or the like discloses an exhaust gas purification catalyst in which 2 or more kinds of inorganic porous particles having different particle sizes are mixed and which includes a catalyst layer having voids with the average void radius of the voids being 12 to 16 μm and having 2 or more voids per cross-sectional area $1 \times 10^4$ μm, the radius of said 2 or more voids being equal to or more than 25 μm.

CITATION LIST

Patent Document

Patent Document 1: Japanese Patent Application Publication No. 2015-171716
Patent Document 2: Japanese Patent Application Publication No. 2014-024058
Patent Document 3: Japanese Patent Application Publication No. 2009-165929
Patent Document 4: Japanese Patent Application Publication No. 2005-021818

SUMMARY OF INVENTION

However, the study of the present inventor showed that the sizes of voids formed by the above described technique are too big and thus the voids tend to be unevenly distributed in the catalyst layer. As a result, it turned out that the exhaust gas is hardly diffused to a portion far from the voids and that the catalyst layer includes a portion not effectively used. The high SV condition relatively tends to occur specifically in the automatic two-wheeled vehicle, compared with the automatic four-wheeled vehicle or the like, so as to have caused a problem that the emission is reduced by the not-purified exhaust gas blowing through. Therefore, a technique of further improving the exhaust gas diffusion property to the catalyst layer is desired for the exhaust gas purification catalyst.

The present invention is made in consideration of the above described circumstances, and the object is to provide an exhaust gas purification catalyst in which the exhaust gas diffusion property to the whole body of the catalyst layer is improved.

The present invention provides an exhaust gas purification catalyst that is arranged on the exhaust path of the internal combustion engine, and that purifies the exhaust gas exhausted from the internal combustion engine. This exhaust gas purification catalyst includes a base material and a catalyst layer that is arranged on the above described base material and that includes a catalyst metal and a carrying material carrying the above described catalyst metal. The above described catalyst layer satisfies all of the following conditions: (1) in a pore distribution curve measured by a mercury porosimeter, a peak for the largest pore volume exists within a range of a pore diameter equal to or more than 1 μm and not more than 10 μm; and (2) on an electron microscopy observation image (with a 1000-fold magnification) of a surface of the above described catalyst layer, when areas of a plurality of voids included in the above described electron microscopy observation image are respectively calculated, a standard deviation for the areas of the plurality of voids is not more than 30 $\mu m^2$.

In the catalyst layer of the above described exhaust gas purification catalyst, the pore volume of the voids respectively having the pore diameter being 1 to 10 μm, in other words, the pore volume of micron size voids being comparatively small size compared with, for example, Patent Document 1 is the largest. Thus, the voids are arranged over the whole body of the catalyst layer, to relatively mitigate the uneven distribution of the voids. The voids would be suitable passages for the exhaust gas. Therefore, it is possible to implement relatively effective use of the voids in the catalyst layer so as to implement diffusing the exhaust gas to the whole body of the catalyst layer. As a result, it is possible to enhance the exhaust gas diffusion property so as to enhance the contact property of the exhaust gas with the catalyst metal, and thus it is possible to suppress not-purified exhaust gas from blowing through.

In accordance with one preferable aspect, the above described carrying material contains alumina, and the half or more of the whole body of the above described carrying material on the mass basis (50 mass % or more) is occupied by the above described alumina. Thus, it is possible to further improve the durable property (particularly, heat resistance property) of the catalyst layer, and to stably keep the voids with the pore diameter 1 to 10 μm even on, for example, the high SV condition. Therefore, for example, on the high SV condition, the emission can be decreased.

In accordance with one preferable aspect, the pore volume of the peak for the above described largest pore volume is equal to or more than 0.03 ml/g. Thus, the diffusion property of the exhaust gas in the catalyst layer can be improved better.

In accordance with one preferable aspect, the above described catalyst layer has the peak for the above described largest pore volume that exists within a range of a pore diameter equal to or more than 1 μm and not more than 3 μm, on the pore distribution curve measured by the mercury porosimeter. Thus, it is possible to implement both of improvement in the exhaust gas purification performance and decrease in the pressure loss at high levels.

In accordance with one preferable aspect, on the above described electron microscopy observation image, when a whole area of the above described catalyst layer is treated as 100 area %, a rate of area occupied by the plurality of voids is equal to or more than 5%. Thus, it is possible to further improve the diffusion property of the exhaust gas in the catalyst layer.

In accordance with one preferable aspect, the rate of the area occupied by the above described voids is not more than 20%. Thus, it is possible to improve the mechanical strength of the catalyst layer so as to suppress the frame portion configuring the void from being peeled out or fallen down from the base material. Therefore, the voids can be kept stably even on, for example, the high SV condition.

In accordance with one preferable aspect, it is used on the above described internal combustion engine of an automatic two-wheeled vehicle. The high SV condition relatively tends to be caused on the automatic two-wheeled vehicle, compared with the automatic four-wheeled vehicle, and the reduction on the emission is becoming a problem to be solved by. Therefore, applying the technique herein disclosed is more effective.

DESCRIPTION OF EMBODIMENTS

Below, one of suitable embodiments in the present invention will be described by reference to the accompanying drawings. Incidentally, the matters other than matters particularly mentioned in this specification, and required for practicing the present invention can be grasped as design matters of those skilled in the art based on the conventional technique in the present field. The present invention can be executed based on the contents disclosed in the present specification, and the technical common sense in the present field. Additionally, in the following accompanying drawings, the members/parts providing the same effect are given the same numerals and signs, and duplicated explanations might be omitted or simplified. The dimensional relation (such as length, width, or thickness) in each drawing does not always reflect the actual dimensional relation. In addition, the representation "A to B" (A, and B are arbitrary numerical values) representing a range in the present specification include not only a meaning that the range is equal to or more than A and not more than B but also a meaning that the range is "preferably bigger than A" and "preferably smaller than B".

Figure 1:
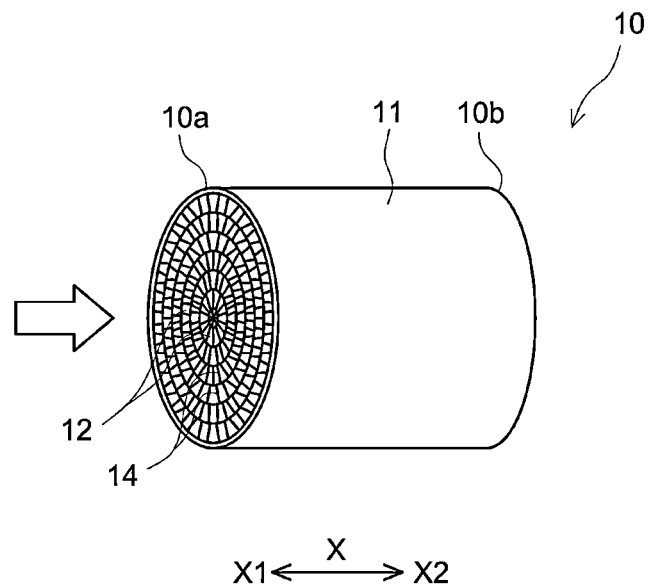
FIG. 1 is a perspective view schematically showing an exhaust gas purification catalyst in accordance with one embodiment of the present invention.

FIG. 1 is a perspective view schematically showing an exhaust gas purification catalyst 10. The exhaust gas purification catalyst 10 is arranged on an exhaust path of an internal combustion engine (engine). The internal combustion engine is configured, for example, with a gasoline engine of an automatic two-wheeled vehicle being as the main constituent. However, the internal combustion engine might be configured, for example, with a gasoline engine or a diesel engine of the automatic four-wheeled vehicle being as the main constituent. The internal combustion engine combusts air-fuel mixture containing oxygen and fuel gas so as to convert the combustion energy into the mechanical energy. The combusted air-fuel mixture becomes exhaust gas so as to be exhausted to the exhaust path. The exhaust gas purification catalyst 10 purifies harmful components, for example, HC, NOx, CO, and the like, which are contained in the exhaust gas exhausted from the internal combustion engine.

Incidentally, the arrow in FIG. 1 shows a flow of the exhaust gas. In other words, in FIG. 1, the left side is the upstream side (front side) of the exhaust path relatively close to the internal combustion engine and the right side is the downstream side (rear side) of the exhaust path relatively far from the internal combustion engine. In addition, in FIG. 1, the reference sign X represents the cylinder axis direction of the exhaust gas purification catalyst 10, in other words, represents the flow direction of the exhaust gas. The exhaust gas purification catalyst 10 is disposed on the exhaust path with the cylinder axis direction X being along the flow direction of the exhaust gas. Hereinafter, one direction X1 of the cylinder axis direction X might be referred to as the upstream side (exhaust gas inflow side, or front side) and the other direction X2 of the cylinder axis direction X might be referred to as the downstream side (exhaust gas outflow side, or rear side). However, these are merely directions for explanatory convenience sake, and do not restrict the disposed form of the exhaust gas purification catalyst 10 at all.

Figure 2:
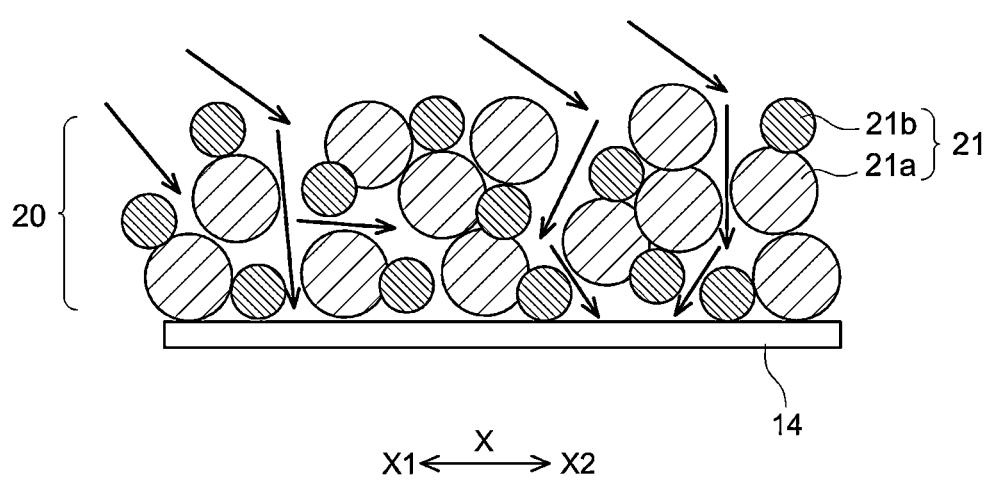
FIG. 2 is a partial cross-sectional view schematically showing a catalyst layer in accordance with one embodiment of the present invention.

The exhaust gas purification catalyst 10 includes a base material 11 of the straight flow structure and a catalyst layer 20 (see FIG. 2). The end part in the one direction X1 of the exhaust gas purification catalyst 10 is an inflow port 10a of the exhaust gas, and the end part in the other direction X2 is an outflow port 10b of the exhaust gas. The external shape of the exhaust gas purification catalyst 10 of the present embodiment is a cylindrical shape. However, the external shape of the exhaust gas purification catalyst 10 is not particularly restricted, and might be, for example, an elliptic cylinder shape, a polygonal cylinder shape, a pipe form, a foam form, a pellet shape, a fiber form, or the like.

The base material 11 configures a framework of the exhaust gas purification catalyst 10. The base material 11 is not particularly restricted, and thus various materials and formations conventionally applied for this kind of usage can be used. The base material 11 of the present embodiment is a metal carrier configured with stainless steel (SUS). This kind of metal carrier is manufactured, for example, by overlaying a metal foil formed in a waveform on a metal foil formed in a flat plate form, then winding the resulted overlaid-member in a roll form, and inserting the resulted wound-member into an external cylinder made of metal. The metal carrier might be the so-called perforated metal carrier in which a hole is formed on the metal foil. In addition, the base material 11 might be a metal carrier made of material other than SUS, for example, made of Fe—Cr—Al type alloy, Ni—Cr—Al type alloy, or the like, or might be a ceramics carrier configured with ceramics, such as cordierite, aluminum titanate, and silicon carbide.

The base material 11 of the present embodiment includes a honeycomb structure. The base material 11 includes a plurality of cells (cavities) 12 being regularly arrayed in the cylinder axis direction X and includes a partition wall (rib) 14 partitioning the plurality of cells 12. Although not particularly restricted, the capacity of the base material 11 (apparent volume including the capacities of cells 12) might be generally equal to or more than 0.01 L, for example, or equal to or more than 0.05 L, and might be generally not more than 5 L, for example, not more than 1 L, not more than 0.5 L, or not more than 0.1 L. Although not particularly restricted, the length of the base material 11 along the cylinder axis direction X (total length) might be generally equal to or more than 10 mm, for example, equal to or more than 20 mm, or equal to or more than 50 mm, and might be generally not more than 500 mm, for example, not more than 200 mm, or not more than 100 mm.

The cell 12 acts as a flow channel of the exhaust gas. The cell 12 extends in the cylinder axis direction X. The cell 12 is a penetration hole that penetrates the base material 11 in the cylinder axis direction X. The shape, the size, and the number of the cell 12 might be set, for example, in consideration of the flow rate or the component of the exhaust gas supplied to the exhaust gas purification catalyst 10. The cross-sectional shape of the cell 12 orthogonal to the cylinder axis direction X is not particularly restricted. The cross-sectional shape of the cell 12 might be, for example, a rectangular, such as a square, a parallelogram, a rectangle, and a trapezoidal, or might be, for example, the other polygon (for example, a triangle, a hexagon, or a octagon), a waveform, a round, or the like, and thus various geometric shape would be applied as the cross-sectional shape of the cell 12.

The partition wall 14 faces to a cell 12 and separates the cell 12 from the adjacent cell 12. Although not particularly restricted, the thickness of the partition wall 14 (the size in a direction orthogonal to the surface, for which the same shall be applied hereafter) might be generally equal to or more than 10 μm, for example, or equal to or more than 20 μm, and might be generally not more than 500 μm, for example, not more than 200 μm, or not more than 100 μm, for the perspective of improving the mechanical strength or decreasing the pressure loss.

FIG. 2 is a partial cross-sectional view schematically showing one part of a cross section of the exhaust gas purification catalyst 10 that is cut along the cylinder axis direction X. In the present embodiment, the catalyst layer 20 is provided on the surface of the base material 11, particularly provided on the partition wall 14. In the present embodiment, the catalyst layer 20 has a single layer structure. The catalyst layer 20 is a field for purifying the exhaust gas. The catalyst layer 20 is a porous body having multiple voids that are communicated to each other. The exhaust gas flowing into the exhaust gas purification catalyst 10 comes into contact with the catalyst layer 20, while flowing in the flow channel (cell 12) of the exhaust gas purification catalyst 10. This purifies the harmful components in the exhaust gas. For example, HC and CO contained in the exhaust gas are oxidized by the catalyst function of the catalyst layer 20 so as to be converted (purified) into water or carbon dioxide. In addition, for example, NOx is reduced by the catalyst function of the catalyst layer 20 so as to be converted (purified) into nitrogen.

The catalyst layer 20 includes a carrying material 21 configuring the frame portion of the catalyst layer 20 and includes a catalyst metal (reaction catalyst) for purifying the harmful components, and the catalyst metal (reaction catalyst) is not shown. The catalyst metal is carried on the surface of the carrying material 21. As for the catalyst metal, various metal species can be used that are able to perform the oxidation catalyst function and/or the reduction catalyst function in order to purify the harmful components as described above. As for the typical example of the catalyst metal, a platinum group, in other words, rhodium (Rh), palladium (Pd), platinum (Pt), ruthenium (Ru), osmium (Os), and iridium (Ir), can be obtained. Further, instead of the platinum group, or in addition to the platinum group, other metal species might be used, such as alkali metal, alkaline earth metal, and transition metal. For example, metal species, such as iron (Fe), cobalt (Co), nickel (Ni), copper (Cu), silver (Ag), and gold (Au), might be used. In addition, a material in which 2 or more kinds of these metals are alloyed might be used. Among them, the oxidation catalyst having a high oxidation activity, for example, at least one among Pd and Pt, and the reduction catalyst having a high reduction activity, for example, Rh, are suitable, and using the combination of them is particularly preferable.

For the perspective of enhancing the contact area with the exhaust gas, it is preferable to make the catalyst metal be a micro particle having a sufficiently small particle diameter for the usage. It is preferable that the average particle diameter of the catalyst metal (average value of number references of the particle diameters obtained by the observation with the transmission electron microscopy (TEM: Transmission Electron Microscope)) is generally 1 to 15 nm, for example, not more than 10 nm, or further not more than 5 nm. It is preferable that the carried amount of the catalyst metal is generally not more than 20 g, typically 0.1 to 10 g, for example, or 0.5 to 5 g, per 1 L volume of the exhaust gas purification catalyst 10 (capacity of the base material 11) in terms of the oxide.

The carrying material 21 carries the catalyst metal. The carrying material 21 is typically in particulate form. It is preferable that the carrying material 21 be an inorganic porous body whose specific surface area is large. As for the carrying material 21, it is preferable to use, for example, a metal oxide having excellent heat resistance or solid solution of such an oxide. As for the typical example of the carrying material 21, it is possible to use a metal oxide, such as aluminum oxide ($Al_2O_3$, alumina), titanium oxide ($TiO_2$, titania), zirconium oxide ($ZrO_2$, zirconia), silicon oxide ($SiO_2$, silica), yttrium oxide ($Y_2O_3$, yttria), lanthanum oxide ($La_2O_3$), cerium oxide ($CeO_2$, ceria), and neodymium oxide ($Nd_2O_3$), to use alkaline-earth metal oxide, such as magnesium oxide (MgO, magnesia), to use alkali metal oxide, and to use solid solutions thereof, for example, $CeO_2$—$ZrO_2$ type complex oxide containing ceria and zirconia, $La_2O_3$—$Al_2O_3$ type complex oxide containing lanthanum oxide and alumina, or the like. As for them, one kind might be used singly or combination of two or more kinds might be used.

In the present embodiment, the carrying material 21 includes a first carrying material 21a and a second carrying material 21b. The surface of the first carrying material 21a and the surface of the second carrying material 21b respectively carry the catalyst metals. When the first carrying material 21a and the second carrying material 21b are compared, at least one among the composition and property is different. In some embodiments, the main (component occupying the largest rate in the mass ratio, preferably component occupying equal to or more than 50 mass %)

element (typically chemical compound, for example, metal oxide) of the first carrying material 21a and the main element of the second carrying material 21b are different. Thus, it is possible to suitably suppress the degradation over time caused by the usage of the exhaust gas purification catalyst 10. In some embodiments, one of the carrying materials has a higher heat resistance, compared with the other one of the carrying materials. In some embodiments, one of the carrying materials is an OSC material having an oxygen storage capacity (OSC: Oxygen Storage capacity), and the other one of the carrying materials is a non-OSC material not having the oxygen storage capacity.

In the present embodiment, the first carrying material 21a is metal oxide containing alumina (Al-containing oxide). The first carrying material 21a has a durable property (particularly, heat resistance) higher than the durable property of the second carrying material 21b described later. The first carrying material 21a might have a bulk density (value measured by a method defined by JIS K1469 (2003), for which the same shall be applied hereafter) larger than the second carrying material 21b described later. The first carrying material 21a might be configured with alumina as the main component. The alumina might be gamma-alumina, delta-alumina, theta-alumina, alpha-alumina, or the like. The Al-containing oxide might contain, for example, at least 1 kind among alumina and complex oxide that is configured with alumina and metal oxide other than the alumina (for example, rare earth metal oxide). The first carrying material 21a might be a non-OSC material. The first carrying material 21a might be metal oxide not containing ceria (non-Ce oxide).

In the present embodiment, the second carrying material 21b is metal oxide containing ceria (Ce-containing oxide). The second carrying material 21b has an oxygen storage capacity higher than the oxygen storage capacity of the first carrying material 21a. The second carrying material 21b might be configured with ceria as the main component. The Ce-containing oxide contains at least 1 kind among ceria and complex oxide that is configured with ceria and metal oxide other than ceria. The complex oxide might be, for example, $CeO_2$—$ZrO_2$ type complex oxide. The $CeO_2$—$ZrO_2$ type complex oxide might be Ce rich or Zr rich. The $CeO_2$—$ZrO_2$ type complex oxide might further contain metal oxide other than $CeO_2$, for example, contain rare earth metal oxide. The second carrying material 21b might be an OSC material. The second carrying material 21b might be metal oxide not containing alumina (non-Al oxide).

In some embodiments, the average particle diameter (average value of number references of the particle diameters obtained by the electron microscopy observation) of the first carrying material 21a and the average particle diameter of the second carrying material 21b are approximately equal. For example, the ratio (Da/db) of the average particle diameter Da of the first carrying material 21a to the average particle diameter db of the second carrying material 21b could be generally less than two times, preferably not more than 1.5, for example, or not more than 1.2. Implementing the range regarding the above described ratio can suppress the situation in which the catalyst layer 20 becomes too close, and can suitably secure the situation in which size-uniformed voids are provided on the catalyst layer 20. In addition, the ratio (Da/db) could be equal to or more than 1. In other words, Da≥db could occur. In FIG. 2, Da>db is satisfied.

The compounding ratio for the first carrying material 21a and the second carrying material 21b is not particularly restricted. In the catalyst layer 20, the first carrying material 21a might be the main component or the second carrying material 21b might be the main component. In some embodiments, when the whole volume of the carrying material 21 is treated as 100 volume %, the volume rate at which the first carrying material 21a (for example, alumina) occupies should be generally equal to or more than 50 volume %, preferably equal to or more than 60 volume %, for example, or equal to or more than 70 volume %. Thus, the first carrying material 21a (for example, alumina) can be used as the frame to form more micron size voids in the catalyst layer 20, so as to further improve the exhaust gas diffusion property. In addition, it is possible to further improve the durable property (particularly, heat resistance) of the catalyst layer 20, and the voids can be kept stably even on, for example, the high SV condition. The volume rate at which the first carrying material 21a (for example, alumina) occupies might be generally not more than 99 volume %, for example, not more than 95 volume %, not more than 90 volume %, or, not more than 85 volume %. Incidentally, the volume of each carrying material 21 can be calculated with the mass and the bulk density.

In addition, the volume of each carrying material 21 can be actually measured by the image analysis on the later described scanning electron microscopy (SEM: Scanning Electron Microscope) observation image, too. For example, when the first carrying material 21a is alumina and the second carrying material 21b is Ce-containing oxide, the black-and-white SEM observation image displays the alumina with gray color and Ce-containing oxide with white color. Therefore, by changing the threshold for the binarization processing after the void portion is separated and then the catalyst layer 20 portion is classified, the alumina portion can be distinguished. Then, the area of alumina occupying the catalyst layer 20 portion can be calculated as the volume rate of alumina.

In the catalyst layer 20 of the present embodiment, the multiple voids are formed with the gaps (voids between particles) of the above described carrying materials 21. The catalyst layer 20 has, on a pore distribution curve measured by a mercury porosimeter, a peak having the largest pore volume (first peak) within a range of pore diameter 1 to 10 μm. Many micron size voids are secured in the catalyst layer 20, and thus it is possible to improve the exhaust gas diffusion property on, for example, the high SV condition. Further, it is possible to decrease the pressure loss. Furthermore, by making the sizes of voids be comparatively small in comparison with a technique as described in, for example, Patent Document 1, it facilitates to arrange the voids in well balance for the whole body of the catalyst layer. The void having a pore diameter 1 to 10 μm is preferable to be formed with alumina being as the frame (in other words, with the gap between alumina particles). In addition, for the perspective of implementing the effect of the technique disclosed herein at a higher level, the first peak might be in a range preferably 1 to 5 μm, or more preferably 1 to 3 μm.

In some embodiments, the pore volume V1 of the first peak might be, for unit quantity (1 g) of the catalyst layer 20, generally equal to or more than 0.02 ml/g, typically equal to or more than 0.03 ml/g, for example, equal to or more than 0.05 ml/g, or furthermore equal to or more than 0.08 ml/g, and generally not more than 0.3 ml/g, typically not more than 0.2 ml/g, for example, or not more than 0.15 ml/g. By making the pore volume V1 of the first peak be equal to or more than a predetermined value, it is possible to improve the diffusion property or the convection property of the exhaust gas in the catalyst layer 20. In addition, by making the pore volume V1 of the first peak be not more than a predetermined value, it is possible to increase the strength of the catalyst layer 20 so as to suppress, for example, the frame portion configuring the void from being peeled out or fallen down from the base material.

In some embodiments, multiple voids are formed on the catalyst layer 20 mainly by the gap (void in the particle) in the above described carrying materials 21. The catalyst layer 20 might have, on the pore distribution curve measured by the mercury porosimeter, a peak having the second largest pore volume (second peak) within a range of pore diameter less than 1 μm (for example, 0.01 to 1 μm, 0.01 to 0.1 μm, or 0.01 to 0.05 μm range). The voids having the pore diameters 1 to 10 μm can be communicated through the void in the particle. Therefore, it is possible to improve the diffusion property of the exhaust gas in the catalyst layer 20. Although not particularly restricted, the ratio of the pore volume V1 of the first peak with respect to the pore volume V2 of the second peak (V1/V2) might be generally 1.2 to 5, for example, or 1.5 to 3.

Incidentally, the pore distribution curve of the catalyst layer 20 can be measured as described below. At first, the catalyst layer 20 is cut out to prepare a sample piece, and a commercially available mercury porosimeter is used to measure the pore distribution curve of the sample piece. The mercury porosimeter can measure the size (pore diameter) and the capacity (pore volume) of the pore, based on the relation between the pressure applied to the mercury and the quantity of the mercury immersed into the void. With the mercury penetration method, it is possible to measure all pores other than the closed holes. Thus, it is possible to obtain the pore distribution curve in which the pore diameter (μm) is represented on the horizontal axis and the pore volume (ml/g) is represented on the vertical axis.

In some embodiments, the integrated pore volume having the pore diameter within a range of 1 to 10 μm (micron size) based on the pore distribution curve might be generally equal to or more than 0.1 ml/g, typically equal to or more than 0.2 ml/g, for example, equal to or more than 0.4 ml/g, or further equal to or more than 0.5 ml/g, and generally not more than 1.2 ml/g, typically not more than 1.0 ml/g, for example, or not more than 0.8 ml/g, for unit quantity (1 g) of the catalyst layer 20. By making the integrated pore volume be equal to or more than a predetermined value, it is possible to improve the diffusion property and the convection property of the exhaust gas in the catalyst layer 20. In addition, by making the integrated pore volume be not more than a predetermined value, it is possible to increase the strength of the catalyst layer 20 so as to suppress the frame portion configuring the void from being peeled out or fallen down from the base material.

The catalyst layer 20 of the present embodiment has a standard deviation not more than 30 μm$^2$ when areas of respective voids in the catalyst layer 20 are calculated on the basis of the electron microscopy observation image (with a 1000-fold magnification) of the surface of the catalyst layer 20. The standard deviation is one of indicators representing the size variation of the voids. The standard deviation with the smaller numerical value indicates that the variation in the areas of the voids does not exist. By making the standard deviation be not more than a predetermined value, it is possible to arrange the micron size vacancy holes in well balance on the whole body of the catalyst layer 20, and to effectively use the whole body of the catalyst layer 20. Thus, it is possible to suppress the exhaust gas from blowing through, for example, even on the high SV condition. For the perspective of suppressing the exhaust gas better from blowing through, the standard deviation of the voids should be preferably not more than 29 μm$^2$, further preferably not more than 28 μm$^2$, for example, or in 10 to 28 μm$^2$.

In some embodiments, the void rate of the catalyst layer 20 (in other words, area rate of voids occupying the whole area of the catalyst layer 20) on the electron microscopy observation image of the surface of the catalyst layer 20 is generally equal to or more than 3 area %, preferably equal to or more than 5 area %, furthermore equal to or more than 10 area %, equal to or more than 11 area %, for example, or equal to or more than 15 area %, and is generally not more than 35 area %, typically not more than 30 area %, preferably not more than 25 area %, for example, not more than 20 area %, or not more than 17 area %. By making the void rate be equal to or more than a predetermined value, it is possible to improve the diffusion property and the convection property of the exhaust gas in the catalyst layer 20. In addition, by making the void rate be not more than a predetermined value, it is possible to increase the strength of the catalyst layer 20, so as to, for example, suppress the frame portion configuring the void from being peeled out or fallen down from the base material.

The catalyst layer 20 might contain not only the catalyst metal and the carrying material 21 but also the other arbitrary component appropriately, depending on the purpose. For example, in the case where the catalyst layer 20 contains an oxidation catalyst (for example, at least one among Pd and Pt) as the catalyst metal, the catalyst layer 20 might contain alkaline earth element, such as calcium (Ca) and barium (Ba). The alkaline earth element exists typically in an oxide form in the catalyst layer 20. In addition, the catalyst layer 20 might contain, for example, an OSC material in which the catalyst metal is not carried, a non-OSC material in which the catalyst metal is not carried, a NOx adsorbing material having a NOx storage capacity, a stabilizing agent, or the like. As for the stabilizing agent, it is possible to obtain a rare earth element other than Ce, for example, yttrium (Y), lanthanum (La), neodymium (Nd), or the like. The rare earth element exists typically in an oxide form in the catalyst layer 20.

Although not particularly restricted, the formed quantity (coated quantity) of the carrying material 21 in the catalyst layer 20 might be generally 20 to 300 g, preferably 30 to 200 g, for example, or 50 to 150 g for the volume (capacity of the base material 11) 1 L of the exhaust gas purification catalyst 10. By satisfying the above described range, it is possible to have both of improvement in the exhaust gas purification performance and decrease in the pressure loss at high levels. Incidentally, the term "formed quantity" in the present specification means a mass of the solid content contained for a unit volume.

The thickness and length of the catalyst layer 20 should be designed in consideration of, for example, the size of the cell 12 of the base material 11 or the flow rate of the exhaust gas supplied to the exhaust gas purification catalyst 10. In some aspects, the thickness of the catalyst layer 20 is generally 1 to 500 μm, for example, 5 to 200 μm, or 10 to 100 μm. In addition, the catalyst layer 20 might be provided over the total length in the cylinder axis direction X of the base material 11, or might be provided on a portion being generally equal to or more than 20%, for example, equal to or more than 50%, or equal to or more than 80%, continuously or intermittently in the cylinder axis direction X, of the total length of the base material 11. Thus, it is possible to implement the effect of the herein disclosed technique at the higher level.

The exhaust gas purification catalyst 10 might include a plurality of catalyst layers (2 or more layers) respectively having different compositions or properties. In this case, it is enough that at least 1 layer among them satisfies the above described configuration of the catalyst layer 20. The exhaust gas purification catalyst 10 might include a catalyst layer other than the catalyst layer 20, a layer other than the catalyst layer, for example, a layer including no catalyst metal, or the like. In addition, the catalyst layer 20 might be a single layer, or, 2 or more layers. In addition, the exhaust gas purification catalyst 10 might include another catalyst layer, for example, in the cylinder axis direction X, which is different from the catalyst layer 20. In some aspects, the exhaust gas purification catalyst 10 might be provided with catalyst layers respectively having different compositions and being respectively disposed at portions of the base material 11, for example, at the upstream side X1 and downstream side X2 in the cylinder axis direction X. At this case, it is possible to dispose the catalyst layer 20 at any portion. The catalyst layer 20 might be provided, for example, along the cylinder axis direction X from the inflow port 10*a* of the exhaust gas or might be provided along the cylinder axis direction X from the outflow port 10*b* of the exhaust gas.

Incidentally, if the particle sizes of carrying materials 21 are uniformed as described later, the catalyst layer 20 can be formed with a conventionally used method, for example, impregnation method, wash coat method, or the like, as for the other procedures. Although not particularly restricted, in one example, the base material 11 and a catalyst layer forming slurry for forming the catalyst layer 20 are prepared. The catalyst layer forming slurry contains a catalyst metal source (for example, solution containing a catalyst metal as an ion) and 2 kinds of carrying materials 21 (first carrying material 21*a* and second carrying material 21*b*) described above, as essential raw material components, and is prepared by adding other arbitrary components, for example, a binder, various additive agents, or the like, into a dispersion medium and by dispersing the added components.

In the catalyst layer forming slurry, uniforming the particle sizes of the carrying materials 21 (in other words, sharpening the particle size distribution of the carrying materials 21) is important. For example, the frequent particle diameter of the whole body of the carrying material 21 (value calculated from a particle diameter distribution measured by a particle size distribution measuring apparatus based on the laser diffraction/scattering method, for which the same shall be applied hereafter) is preferable to be within a range generally not more than 20 µm, typically 1 to 10 µm, for example, or 2 to 8 µm, and the cumulative frequency of the range for the frequent particle diameter +2 µm is preferable to be generally equal to or more than ⅓, for example, or equal to or more than 40%. Therefore, in some aspects, for example, when the particle diameter median values of a plurality of carrying materials 21 as the raw material (median diameter calculated from a particle diameter distribution measured by a particle size distribution measuring apparatus based on the laser diffraction/scattering method, for which the same shall be applied hereafter) are different, the particle size adjustment might be performed on at least 1 among the plurality of carrying materials 21 before the carrying materials 21 are added to the dispersion medium. In this case, it is preferable to make the particle diameter median values of the plurality of carrying materials 21 be approximately equal to each other (generally no more than ±5 µm, for example, or no more than ±2 µm) before adding to the dispersion medium. Or, in some other aspects, the particle size adjustment might be performed to satisfy the above described ranges of the frequent particle diameter and the cumulative frequency after the plurality of carrying materials 21 are added and mixed to the dispersion medium. Incidentally, the particle size adjustment on the carrying materials 21 can be appropriately performed by a conventionally well known method, for example, crushing, sieving, or the like with a stirring device, a crushing device, a bead mill, a ball mill, or the like.

Next, the prepared catalyst layer forming slurry is flown into the cell 12 from the end part of the base material 11 to be supplied to a predetermined length along the cylinder axis direction X. The base material 11, to which the slurry was supplied, is dried or baked at a predetermined temperature. Thus, by sintering the raw material component, the catalyst layer 20 is formed on the partition wall 14. In the present embodiment, by preparing to uniform the particle sizes of the carrying materials 21, the carrying materials 21 are hardly subjected to the closest packing on the base material 11. Thus, it is possible to homogenously form the voids whose pore diameters are 1 to 10 µm (micron size) in the catalyst layer 20.

As described above, in the catalyst layer 20 of the present embodiment, the pore volume of voids having the pore diameters 1 to 10 µm, in other words, the pore volume of micron size voids is increased. In addition, the voids are arranged in well balance on the whole body of the catalyst layer 20, and the imbalance of big voids is decreased. Therefore, it is possible to effectively use the voids of the catalyst layer 20 so as to diffuse the exhaust gas to the whole body of the catalyst layer 20. As a result, it is possible to enhance the contact property of the exhaust gas with the catalyst metal. In addition, suitably, the exhaust gas is made to slowly (taking the time) pass through the catalyst layer 20, and thus it is possible to extend the contact time of the exhaust gas and catalyst metal. Therefore, it is possible to suppress the not-purified exhaust gas from blowing through, so as to suitably improve the purification performance of the harmful components, for example, HC purification performance or NOx purification performance.

Figure 5:
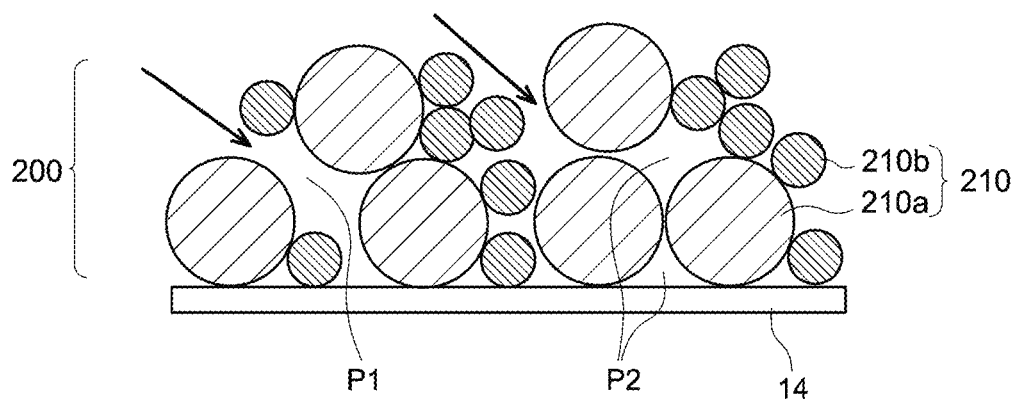
FIG. 5 is a partial cross-sectional view schematically showing a catalyst layer in accordance with a conventional example.

In contrast, FIG. 5 is a partial cross-sectional view schematically showing one part of a cross section of an exhaust gas purification catalyst in accordance with a conventional example. In FIG. 5, the catalyst layer 200 is provided on the partition wall 14. The catalyst layer 200 includes 2 kinds of carrying materials 21 respectively having different average particle diameters, in other words, includes the first carrying material 210*a* and the second carrying material 210*b*. The first carrying material 210*a* has a relatively large average particle diameter, and particularly, the average particle diameter is equal to or more than two times of the second carrying material 210*b*. Thus, for example, as shown with P1 in FIG. 5, forming a large void is facilitated by the void between particles of the first carrying materials 210*a*. On the other hand, for example, as shown with P2 in FIG. 5, if the second carrying materials 210*b* are clogged between particles of the first carrying materials 210*a*, the void is closed and it becomes difficult to implement the effective usage. Therefore, it is thought that, in the conventional catalyst layer 200, compared with the catalyst layer 20 in accordance with the present embodiment, the exhaust gas is hardly diffused to the whole body of the catalyst layer 200, and the not-purified exhaust gas is easily blown through.

The exhaust gas purification catalyst 10 can be used to purify the exhaust gas exhausted from various internal combustion engines. For example, it can be suitably applied for a vehicle, such as an automatic two-wheeled vehicle, an engine-equipped bicycle, and an automatic four-wheeled vehicle, for a marine product, such as a vessel, a tanker, a jet ski, a personal watercraft, and an outboard motor, for a gardening product, such as a mowing machine, a chain saw, and a trimmer, for a leisure product, such as a golf cart, and a four-wheeled buggy, for a power generation apparatus, such as a cogeneration system, and for an internal combustion engine, such as a garbage incinerator. Among them, it can be suitably used for the engine of the automatic two-wheeled vehicle in which the high SV condition tends to occur.

Below, a test example related to the present invention is explained, but it is not intended that the present invention is restricted to the content shown by the following test example.

At first, as for the carrying materials, 3 kinds of metal oxides shown in Table 1 are prepared.

TABLE 1

Metal oxides

| Kind | Characteristics | |
|---|---|---|
| | Bulk density (g/ml) | Particle diameter median value (μm) |
| Alumina I | 0.5 | 30 |
| Alumina II | 0.2 | 15 |
| Ce-containing oxide | 0.3 | 5 |

(Catalyst A) In this example, at first, alumina I (50 g) and Ce-containing oxide (50 g) as the carrying materials, and palladium nitrate solution (10.7 g) and rhodium nitrate solution (2.7 g) as the catalyst metal sources were fed to ion exchange water (100 ml) and were mixed. Next, this mixed liquid was stirred for 1 hour by a stirring device (brand name HEIDON, model type: BL1200, made by Shinto Scientific Co., Ltd., number of rotations: 300 rpm). By doing this, the particle size adjustment was performed on the carrying materials (in other words, alumina I and Ce-containing oxide) to uniform the particle sizes of the carrying materials so as to implement the condition where the frequent particle diameter is 6 μm and the cumulative frequency having a range of the frequent particle diameter +2 μm is equal to or more than 40%. By doing this, the slurry 1 was prepared.

Next, a metal honeycomb base material (made of SUS, cylindrical shape, total length: 60 mm, and capacity: 75 ml) was prepared. Next, the prepared slurry 1 described above was introduced into the cell from the end part of the metal honeycomb base material, and the surface of the partition wall was coated by 60 mm width that is the same as the total length of the base material. At that time, the coated quantity was set to be 7.55 g (in it, Pd quantity was 0.04 g and Rh quantity was 0.01 g). Then, the base material coated with the slurry 1 was dried for 1 hour at 250 degrees Celsius and then was baked for 1 hour at 500 degrees Celsius so as to form the catalyst layer on the base material. By doing this, the catalyst A was obtained.

(Catalyst B) In this example, alumina II was used instead of the alumina I, the use quantity of the alumina II was 66 g, the use quantity of the Ce-containing oxide was changed to be 34 g, although other procedures were similar to those for the catalyst A, and thus the catalyst B was obtained.

(Catalyst C) In this example, the use quantity of the alumina II was changed to be 75 g, the use quantity of the Ce-containing oxide was changed to be 25 g, although other procedures were similar to those for the catalyst B, and thus the catalyst C was obtained.

(Catalyst D) In this example, the alumina II was used instead of the alumina I, alumina II and Ce-containing oxide were mixed without performing the particle size adjustment of the carrying materials while keeping the different particle sizes of both, although other procedures were similar to those for the catalyst A, and thus the catalyst D was obtained.

(Catalyst E) In this example, the use quantity of the alumina II was changed to be 34 g, the use quantity of the Ce-containing oxide was changed to be 66 g, although other procedures were similar to those for the catalyst D, and thus the catalyst E was obtained.

(Catalyst F) In this example, the use quantity of the alumina II was changed to be 25 g, the use quantity of the Ce-containing oxide was changed to be 75 g, although other procedures were similar to those for the catalyst D, and thus the catalyst F was obtained.

[Measuring Pore Distribution Curve by Mercury Porosimeter]

Figure 3:
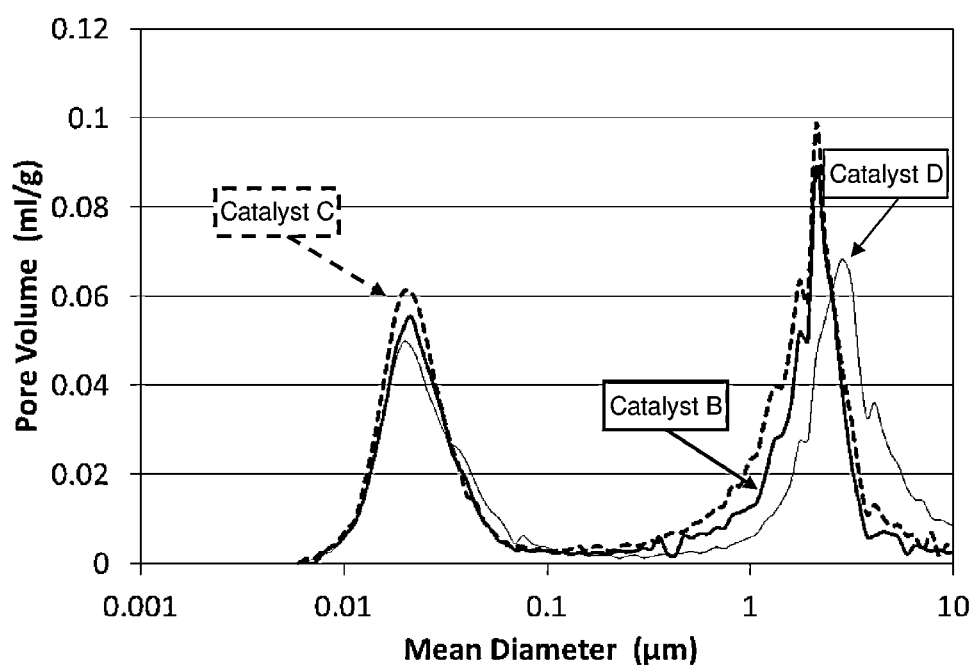
FIG. 3 is a chart representing pore distribution curves of catalysts B to D.
Figure 4A:
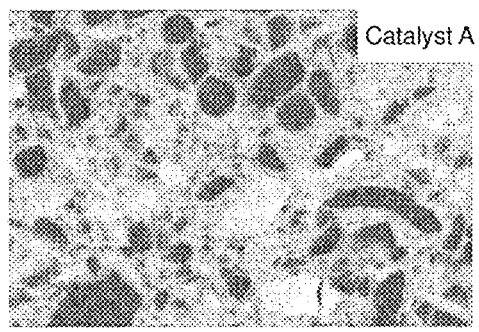
FIGS. 4A to 4D are SEM observation images of the catalysts A to D.
Figure 4B:
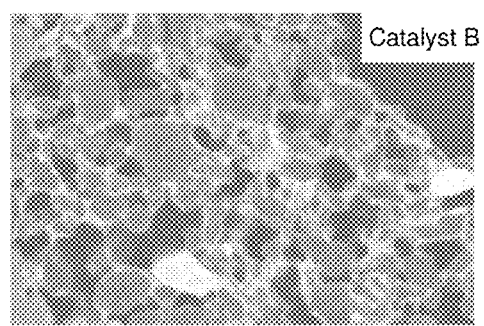
Figure 4C:
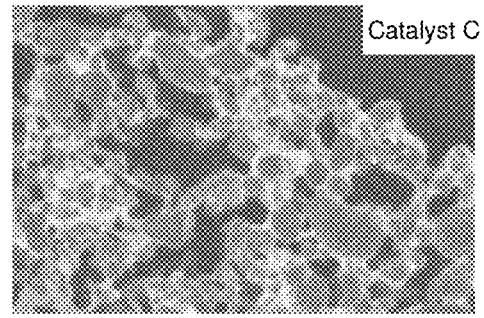
Figure 4D:
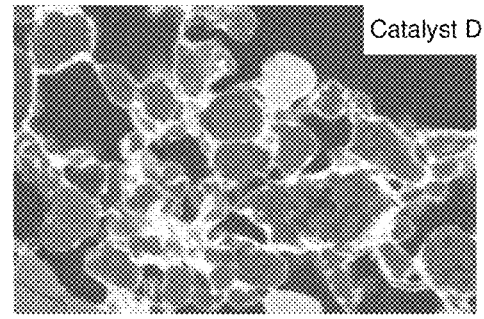

For the manufactured catalysts B to D described above, partition wall portions on which the catalyst layers were formed were cut out. Next, a commercially available mercury porosimeter was used to perform measurement at the pressure range of 0.01 to 200 MPa with the mercury penetration method, so as to evaluate the pore diameters within the range of 100 to 0.01 μm. Next, a pore distribution curve was made that represents the pore diameter (μm) on the horizontal axis and represents the pore volume (ml/g) on the vertical axis. FIG. 3 shows a chart of pore distribution curves of the catalysts B to D. Then, in each of the pore distribution curves, a peak having the largest pore volume was treated as "first peak" and the pore diameter (Mean Diameter) and the pore volume (Pore Volume) of the "first peak" were read out. The results are shown in Table 2. In addition, from the integrated area within a range of pore diameter being 1 to 10 μm, the integrated pore volume of micron size pores included in a unit quantity (1 g) of the catalyst layer was calculated. The results are shown in Table 2.

[Evaluation Result with Mercury Porosimeter]

As shown in Table 2 and FIG. 3, any of catalysts B to D had the first peak within a range of pore diameter 1 to 10 μm (particularly, 1 to 3 μm). In addition, when the catalysts B and C were compared, the catalyst C with the large volume ratio of the first carrying material (alumina) had the larger pore volume of the first peak.

[Observing Void with Scanning Electron Microscopy (SEM)]

At first, for the manufactured catalysts A to F described above, partition wall portions on which the catalyst layers were formed were cut out. Next, the surfaces of the catalyst layers were observed with SEM, and SEM observation images (observation magnification: 1000 times) were obtained. Next, an image analysis type particle size distribution measurement software, Mac-View (made by Mountech Co., Ltd.), was used, the processing range was set to the catalyst layers, the following procedures 1 to 4 were performed to analyze the SEM observation images, and then the whole void area for a unit area (4500 μm$^2$) of each catalyst layer was calculated. In addition, the void rate of the catalyst layer (in other words, a rate of voids occupying the whole area of the catalyst layer) was calculated. As examples, FIGS. 4A to 4D show distributions of voids in the catalysts A to D. In addition, for a plurality of voids included in the above described SEM observation image, areas were respectively calculated and standard deviations respectively for the areas of the plurality of voids were calculated. The results are shown in Table 2.

(Procedure 1) By the automatically binarization processing (discriminant analysis method), binary images were obtained.
(Procedure 2) Black color portions on the binary images were recognized as the voids so as to be separated.
(Procedure 3) The area for each void was calculated.
(Procedure 4) The total area for the voids with the whole area of the catalyst layer being treated as 100% was calculated.

[Evaluation Results with SEM]

As shown in FIGS. 4A to 4D, on the catalyst D, relative coarse voids were severally observed, compared with the catalysts A to C. In fact, as shown in Table 2, the whole void area (and the rate of void area) of the catalyst D was the largest. In addition, as shown in Table 2, the whole void area (and the rate of the void area) tended to be increased, and the variation for areas of the respective voids tended to be increased. On the catalysts D to F, the standard deviations for the respective voids were increased to be equal to or more than 35 $\mu m^2$. In contrast, on the catalysts A to C, area differences for the respective voids were smaller, and the standard deviations were suppressed to be not more than 30 $\mu m^2$. In other words, sizes of respective voids were uniformed.

[Measuring Catalyst Performance]

At first, the manufactured catalysts A to F described above were disposed on an exhaust gas pipe of an engine of an actual machine vehicle (exhaust gas quantity: 110 $cm^3$), and the measurements were performed on the emissions respectively at the cold start case and the hot start case when the actual machine vehicle was driven with the WMTC (World-wide-harmonized Motorcycle Test Cycle) mode. Incidentally, the weight coefficients used for the emission calculations were respectively set to be 50% for the cold evaluation and 50% for the hot evaluation. Table 2 shows mode emissions for non-methane hydrocarbons (NMHC: non-methane hydrocarbons) and NOx.

[Evaluation Result for Catalyst Performance]

As shown in Table 2, on the catalyst A for which no void was observed and the analysis was not performed, the mode emissions for NMHC and NOx were the highest. In other words, the catalyst A had the worst purification performance. As the reason for this, it would be thought that the exhaust gas diffusion property in the catalyst layer was low so as to induce insufficient contact of the exhaust gas with the catalyst metal. On the catalysts D to F, the void areas were larger in comparison with the catalysts B and C, but the mode emissions for NMHC and NOx both were higher than the catalysts B and C. In other words, the catalysts D to F had bad purification performances in comparison with the catalysts B and C. As the reason for this, it would be thought that large voids were unevenly distributed in the catalyst layer and were not arranged in well balance on the whole body of the catalyst layer. It would be thought that, as a result, little exhaust gas was diffused to the portions of the catalyst layer far from the large voids and non-effectively used portions occurred in the catalyst layer, so as to induce insufficient contact of the exhaust gas with the catalyst metal.

Compared with these comparative examples, the mode emissions for NMHC and NOx both on the catalysts B and C were lower. In other words, the catalysts B and C had relatively superior purification performances. As the reason for this, it would be thought that, by satisfying all of the following conditions: (1) having the first peak within the range of pore diameter 1 to 10 $\mu m$ (micron size, for example, 1 to 3 $\mu m$) on the pore distribution curve; and (2) having the standard deviation for the areas of the plurality of voids being not more than 30 $\mu m^2$ (for example, not more than 28 $\mu m^2$), the exhaust gas is easily diffused to the whole body of the catalyst layer and the whole body of the catalyst layer is effectively used, so as to improve the contact property of the exhaust gas with the catalyst metal.

TABLE 2

| | | Catalyst A | Catalyst B | Catalyst C | Catalyst D | Catalyst E | Catalyst F |
|---|---|---|---|---|---|---|---|
| Carrying material | First carrying material | Alumina I | | | Alumina II | | |
| | Second carrying material | | | Ce-containing oxide | | | |
| | Mass ratio (first/second) | 50/50 | 66/34 | 75/25 | 50/50 | 34/66 | 25/75 |
| | Volume ratio (first/second) | 37/63 | 74/26 | 82/18 | 60/40 | 44/56 | 33/67 |
| | Particle size adjustment | Performed | Performed | Performed | Not-performed | Not-performed | Not-performed |
| Pore distribution curve | First peak ($\mu m$) | — | 2.1 | 2.1 | 2.8 | — | — |
| | Pore capacity of first peak | — | 0.089 | 0.099 | 0.068 | — | — |
| | Integrated pore capacity (ml/g) *1 | — | 0.574 | 0.722 | 0.684 | — | — |
| SEM observation | Whole void area ($\mu m^2$/ 4500 $\mu m^2$) | —*2 | 535 | 730 | 953 | 867 | 805 |
| | Rate of void area | —*2 | 11.9% | 16.2% | 21.2% | 19.3% | 17.9% |
| | Distribution of voids (FIG. 4) | (A) | (B) | (C) | (D) | — | — |
| | Standard deviation for the respective voids ($\mu m^2$) | — | 13.3 | 27.6 | 55.3 | 44.2 | 37.6 |

TABLE 2-continued

|  |  | Catalyst A | Catalyst B | Catalyst C | Catalyst D | Catalyst E | Catalyst F |
|---|---|---|---|---|---|---|---|
| Mode emission | NMHC (g/km) | 0.137 | 0.123 | 0.122 | 0.126 | 0.126 | 0.128 |
|  | NOx (g/km) | 0.082 | 0.059 | 0.057 | 0.063 | 0.066 | 0.073 |

*1: Micron size (diameter 1 to 10 μm) pore.
*2: No void was observed and the analysis was not performed.

Up to this point, a detailed description has been given by way of specific embodiments, which are merely illustrative. The present invention can be implemented with other various forms. The present invention can be executed based on the contents disclosed in the present specification, and the technical common sense in the present field. The techniques recited in claims include contents in which the illustrated embodiments described above are variously deformed or changed. For example, one part of the above described embodiments can be replaced with other deformed aspect, and further, other deformed aspect can be added to the above described embodiments. In addition, if not explained as the essential content, the technical feature can be appropriately deleted.

REFERENCE SIGNS LIST

10 Exhaust gas purification catalyst
11 Base material
12 Cell
14 Partition wall
20 Catalyst layer
21 Carrying material
21a First carrying material
21b Second carrying material

The invention claimed is:

1. An exhaust gas purification catalyst that is arranged on an exhaust path of an internal combustion engine and purifies exhaust gas exhausted from the internal combustion engine, the exhaust gas purification catalyst comprising:
a base material; and
a catalyst layer that is arranged on the base material and comprises:
a catalyst metal; and
a carrying material carrying the catalyst metal,
wherein the catalyst layer satisfies all of conditions described below:
(1) in a pore distribution curve measured by a mercury porosimeter, a peak for the largest pore volume exists within a range of a pore diameter equal to or more than 1 μm and not more than 10 μm; and
(2) on an electron microscopy observation image (with a 1000-fold magnification) of a surface of the catalyst layer, when areas of a plurality of voids comprised in the electron microscopy observation image are respectively calculated, a standard deviation for the areas of the plurality of voids is not more than 30 μm$^2$.

2. The exhaust gas purification catalyst according to claim 1, wherein the carrying material contains alumina, and the alumina occupies half or more of a whole body of the carrying material on a mass basis.

3. The exhaust gas purification catalyst according to claim 2, wherein a pore volume of the peak for the largest pore volume is equal to or more than 0.03 ml/g.

4. The exhaust gas purification catalyst according to claim 2, wherein the catalyst layer has the peak for the largest pore volume that exists within a range of a pore diameter equal to or more than 1 μm and not more than 3 μm, on the pore distribution curve measured by the mercury porosimeter.

5. The exhaust gas purification catalyst according to claim 2, wherein on the electron microscopy observation image, when a whole area of the catalyst layer is treated as 100 area %, a rate of area occupied by the plurality of voids is equal to or more than 5%.

6. The exhaust gas purification catalyst according to claim 2, the exhaust gas purification catalyst is used on the internal combustion engine of an automatic two-wheeled vehicle.

7. The exhaust gas purification catalyst according to claim 1, wherein a pore volume of the peak for the largest pore volume is equal to or more than 0.03 ml/g.

8. The exhaust gas purification catalyst according to claim 7, wherein the catalyst layer has the peak for the largest pore volume that exists within a range of a pore diameter equal to or more than 1 μm and not more than 3 μm, on the pore distribution curve measured by the mercury porosimeter.

9. The exhaust gas purification catalyst according to claim 7, wherein on the electron microscopy observation image, when a whole area of the catalyst layer is treated as 100 area %, a rate of area occupied by the plurality of voids is equal to or more than 5%.

10. The exhaust gas purification catalyst according to claim 1, wherein the catalyst layer has the peak for the largest pore volume that exists within a range of a pore diameter equal to or more than 1 μm and not more than 3 μm, on the pore distribution curve measured by the mercury porosimeter.

11. The exhaust gas purification catalyst according to claim 10, wherein on the electron microscopy observation image, when a whole area of the catalyst layer is treated as 100 area %, a rate of area occupied by the plurality of voids is equal to or more than 5%.

12. The exhaust gas purification catalyst according to claim 1, wherein on the electron microscopy observation image, when a whole area of the catalyst layer is treated as 100 area %, a rate of area occupied by the plurality of voids is equal to or more than 5%.

13. The exhaust gas purification catalyst according to claim 12, wherein the rate of the area occupied by the plurality of voids is not more than 20%.

14. The exhaust gas purification catalyst according to claim 1, the exhaust gas purification catalyst is used on the internal combustion engine of an automatic two-wheeled vehicle.

15. The exhaust gas purification catalyst according to claim 1, wherein the base material is a metal selected from the group consisting of stainless steel, Fe—Cr—Al type alloy, Ni—Cr—Al type alloy.

16. The exhaust gas purification catalyst according to claim 1, wherein the base material is a ceramic selected from the group consisting of cordierite, aluminum titanate, and silicon carbide.

17. The exhaust gas purification catalyst according to claim 1, wherein the catalyst metal is selected from the group consisting of rhodium, palladium, platinum, ruthenium, osmium, and iridium.

18. The exhaust gas purification catalyst according to claim 1, wherein the catalyst metal is selected from the group consisting of an alkali metal, an alkaline-earth metal, and a transition metal.

19. The exhaust gas purification catalyst according to claim 1, wherein the catalyst metal is selected from the group consisting of iron, cobalt, nickel, copper, silver, and gold.

* * * * *